United States Patent
Toh et al.

(10) Patent No.: US 8,286,323 B2
(45) Date of Patent: Oct. 16, 2012

(54) ROBOT-DEPLOYED ASSEMBLY TOOL AND METHOD FOR INSTALLING FASTENERS IN AIRCRAFT STRUCTURES

(75) Inventors: Chin H. Toh, Orange, CA (US); Edward Bruce Harman, Lakewood, CA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/272,379

(22) Filed: Oct. 13, 2011

(65) Prior Publication Data

US 2012/0030926 A1 Feb. 9, 2012

Related U.S. Application Data

(62) Division of application No. 11/618,431, filed on Dec. 29, 2006, now Pat. No. 8,051,547.

(51) Int. Cl.
*B23P 17/00* (2006.01)

(52) U.S. Cl. ........... 29/525.01; 29/464; 29/709; 29/720; 29/798; 901/40

(58) Field of Classification Search ............... 29/525.01, 29/464, 709, 720, 798, 897; 901/40
See application file for complete search history.

(56) References Cited

U.S. PATENT DOCUMENTS

| | | | |
|---|---|---|---|
| 4,967,947 A * | 11/1990 | Sarh | 227/52 |
| 5,896,637 A | 4/1999 | Sarh | |
| 6,098,260 A | 8/2000 | Sarh | |
| 6,505,393 B2 | 1/2003 | Stoewer et al. | |
| 6,536,100 B2 | 3/2003 | Sarh et al. | |
| 6,729,809 B2 | 5/2004 | Sarh et al. | |
| 6,796,014 B2 | 9/2004 | Sarh | |
| 7,003,860 B2 | 2/2006 | Bloch et al. | |
| 7,987,575 B2 | 8/2011 | Hotz et al. | |
| 2002/0007548 A1 | 1/2002 | Stoewer et al. | |
| 2008/0000070 A1 | 1/2008 | Hotz et al. | |
| 2008/0028880 A1 | 2/2008 | Asada et al. | |
| 2008/0155807 A1 | 7/2008 | Toh et al. | |

FOREIGN PATENT DOCUMENTS

DE 102004015978 A1 12/2005

OTHER PUBLICATIONS

Roy et al., "Design of a Reconfigurable Robot Arm for Assembly Operations inside an Aircraft Wing-Box," Proceedings of the 2005 IEEE International Conference on Robotics and Automation, Apr. 2005, pp. 590-595.
Office Action regarding U.S. Appl. No. 11/618,431, dated Mar. 14, 2011.
Response to Office Action regarding U.S. Appl. No. 11/618,431, dated Jun. 14, 2011.

(Continued)

*Primary Examiner* — Derris Banks
*Assistant Examiner* — Azm Parvez
(74) *Attorney, Agent, or Firm* — Yee & Associates, P.C.

(57) ABSTRACT

An assembly system and method for assembling an aircraft wing box or other structure that may define an interior area accessible through at least one access opening are provided. The method includes inserting a robot having an assembly tool mounted thereto into the interior area through the at least one access opening. The assembly tool may be positioned at a fastener location, and may be clamped to the structure. A hole may be made through the structure, and a fastener may be installed in the hole.

25 Claims, 11 Drawing Sheets

OTHER PUBLICATIONS

Notice of Allowance regarding U.S. Appl. No. 11/618,431, dated Jul. 20, 2011.

Amendment Under 37 C.F.R. section 1.312 regarding U.S. Appl. No. 11/618,431, dated Aug. 8, 2011.

* cited by examiner

ROBOT-DEPLOYED ASSEMBLY TOOL AND METHOD FOR INSTALLING FASTENERS IN AIRCRAFT STRUCTURES

This application is a divisional of application Ser. No. 11/618,431, filed Dec. 29, 2006, status allowed.

BACKGROUND

1. Technical Field

The disclosure relates generally to an assembly tool and method and, more particularly, to a robot-deployed assembly tool and method for installing fasteners in an interior area of an aircraft wing box or other structure.

2. Description of the Related Art

When attaching wing skins to the spar caps and bulkheads using various fasteners during wing box assembly, for example, operator mechanics may be required to enter into the wing box and work with various hand tools in order to complete the assembly process. Typically, the operator locates an intended drilling location, manually drills a stackup of spar cap and wing skin or bulkhead flange and wing skin, removes the detail parts and then performs de-burring and cleanup. The operator may then reposition the parts and align the drilled holes prior to fastener installation.

Carrying many often heavy tools and performing the highly repetitive assembly actions in an interior area of a wing box or similar structure can cause fatigue, discomfort and possible injury to the operator. Adequate lighting and ventilation must also be maintained to ensure satisfactory working conditions.

There is, accordingly, a need for a mechanism for assisting an operator in performing fastener installation or other repetitive assembly tasks without the necessity of having the operator enter into an interior area of an aircraft wing box or other structure.

SUMMARY

An embodiment of the disclosure provides a method for assembling a structure that may define an interior area accessible through at least one access opening. The method includes inserting a robot having an assembly tool mounted thereto into the interior area through the at least one access opening. The assembly tool may be positioned at a fastener location, and may be clamped to the structure. A hole may be made through the structure, and a fastener may be installed in the hole.

A further embodiment of the disclosure provides an assembly system for assembling a structure that may define an interior area accessible through at least one access opening. The assembly system includes a robot having an assembly tool mounted thereto. The assembly tool may include a positioning mechanism for positioning the assembly tool in the interior area. A clamp may be provided for clamping the assembly tool in the interior area of the structure during making of a hole in the structure, and a fastener installing mechanism may be provided for installing a fastener in the hole.

A further embodiment of the disclosure provides a method for assembling a structure that may define an interior area accessible through at least one access opening. The method includes inserting a robot arm having an assembly tool mounted thereto into the interior area through the at least one access opening. The assembly tool may be positioned at a fastener location of the structure, and may be clamped to an interior surface of the structure to substantially eliminate any gap between components of the structure to be assembled. A hole may be made through the components to be assembled, and a fastener may be installed in the hole to secure the components to be assembled.

The features, functions, and advantages can be achieved independently in various embodiments or may be combined in yet other embodiments.

BRIEF DESCRIPTION OF THE DRAWINGS

The novel features believed characteristic of the embodiments are set forth in the appended claims. The embodiments themselves, however, as well as a preferred mode of use, further objectives and advantages thereof, will best be understood by reference to the following detailed description of advantageous embodiments when read in conjunction with the accompanying drawings.

DETAILED DESCRIPTION OF PREFERRED EMBODIMENTS

Figure 1:
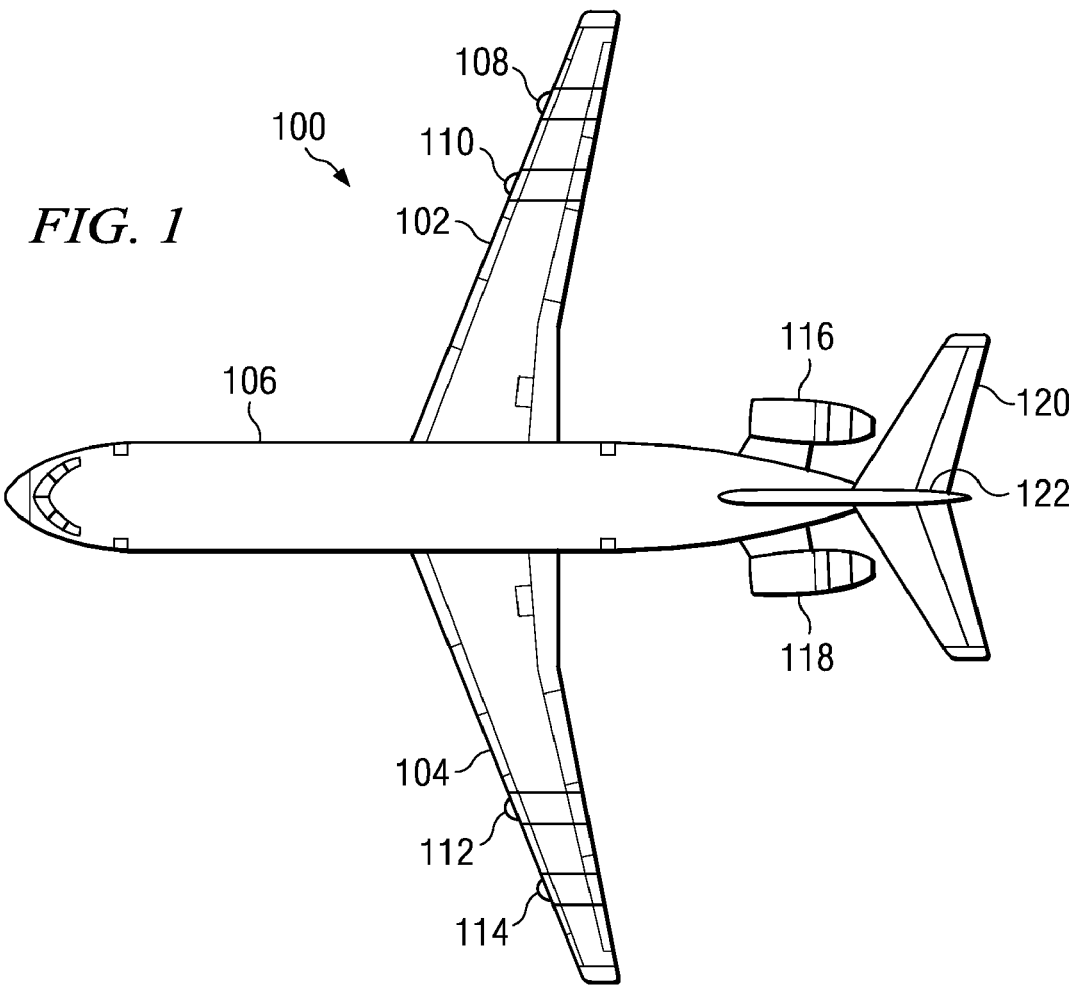
FIG. 1 is an illustration of an aircraft in which advantageous embodiments of the disclosure may be implemented.

With reference now to the figures, and, in particular, with reference to FIG. 1, an illustration of an aircraft is depicted in which advantageous embodiments of the disclosure may be implemented. More particularly, aircraft 100 is an example of a structure in which a robot-deployed assembly tool and an assembly method in accordance with advantageous embodiments of the disclosure may be implemented.

In this illustrative example, aircraft 100 has wings 102 and 104 attached to body 106. Aircraft 100 includes wing mounted engines 108, 110, 112 and 114. Further, aircraft 100 also includes body mounted engine 116, body mounted engine 118 and horizontal and vertical stabilizers 120 and 122, respectively.

Figure 2:
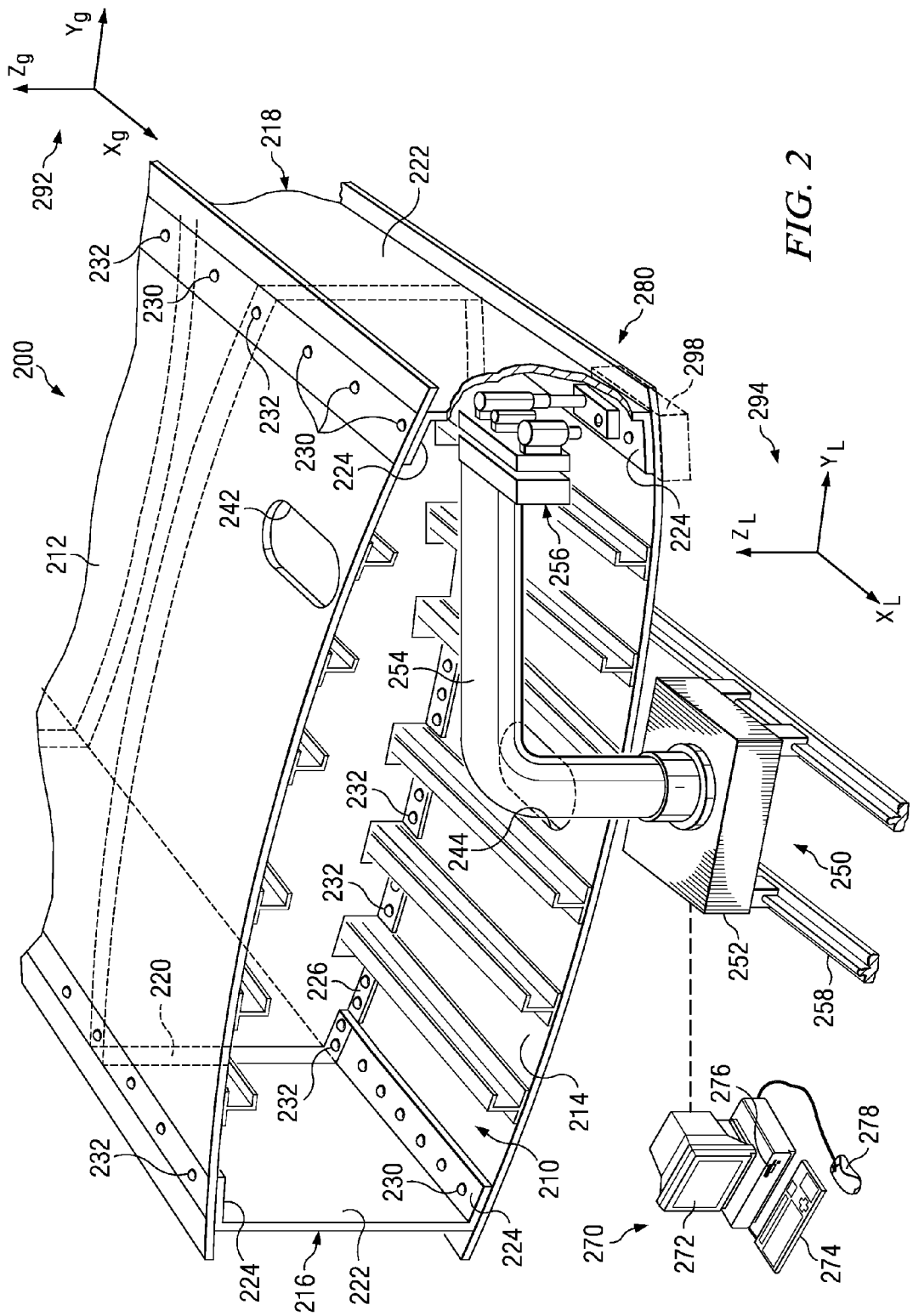
FIG. 2 is an illustration of a section of a wing box for an aircraft and a robot-deployed assembly tool for assembling the wing box in accordance with an advantageous embodiment of the disclosure.

FIG. 2 is an illustration of a section of a wing box for an aircraft and a robot-deployed assembly tool for assembling the wing box in accordance with an advantageous embodiment of the disclosure. Specifically, FIG. 2 illustrates a portion of wing box 200, for example, although not limited to wings only, such as one of wings 102 and 104, and robot-deployed assembly tool 250 for assembling components of wing box 200. The interior area of wing box 200, generally designated by reference number 210, is an example of a confined or bounded area within which robot-deployed assembly tool 250 may be advantageously employed, although it should be understood that advantageous embodiments are not limited to employing robot-deployed assembly tool 250 in any particular area.

Wing box 200 is comprised of a plurality of components including top skin panel 212, bottom skin panel 214, wing spars 216 and 218, and wing box bulkhead 220. Wing spars 216 and 218 each include wing spar web portion 222 and wing spar cap portions 224, and wing box bulkhead 220 includes bulkhead flanges including bulkhead flange 226. As shown in FIG. 2, assembly of wing box 200 requires that cap portions 224 of wing spars 216 and 218 and bulkhead flanges 226 of wing box bulkhead 220 be fastened to top and bottom skin panels 212 and 214 and to each other at numerous fastener locations, including centrally located straight fastener locations such as locations 230, and corner fastener locations such as locations 232, using appropriate fasteners (not illustrated in FIG. 2). Yet other fastening operations may also be performed if needed. The fasteners may include, but are not limited to, bolts or screws that may extend through aligned openings in the components to be assembled and may be secured by nuts, collars or other suitable securing elements.

The fastening operation may require access to interior area 210 of wing box 200 and this is typically achieved, in the case of large wing boxes, by an operator entering into interior area 210 and using appropriate hand tools needed to complete the assembly process. As indicated previously, performing the highly repetitive assembly actions in the interior area of a wing box can cause fatigue, discomfort and possible injury to the operator.

Advantageous embodiments of the disclosure provide a robot-deployed assembly tool, such as robot-deployed assembly tool 250 in FIG. 2 to facilitate assembly of the components of wing box 200 by making it unnecessary for an operator to enter into interior area 210 of wing box 200.

More particularly, robot-deployed assembly tool 250 generally comprises robot body 252, robot arm 254 and assembly tool module 256. Robot body 252 may be mounted on track 258 for movement to desired assembly positions, although it should be understood that other mechanisms may be used to provide mobility to robot-deployed assembly tool 250, and it is not intended to limit advantageous embodiments to any particular mechanism for moving robot-deployed assembly tool 250. Robot arm 254 may extend from robot body 252 and carry assembly tool module 256 at the outer end thereof.

As shown in FIG. 2, one or more access openings that are typically provided in wing box 200 for maintenance purposes and the like, may provide robot arm 254 and assembly tool module 256 attached thereto with access to interior area 210 of wing box 200. In the advantageous embodiment illustrated in FIG. 2, one access opening 242 is provided in top skin panel 212 and one access opening 244 is provided in bottom skin panel 214. It should be understood, however, that the number of access openings and their positioning is intended to be exemplary only, as one or more access openings can be provided at any desired location or locations of wing box 200.

FIG. 2 illustrates robot arm 254 of robot-deployed assembly tool 250 inserted into interior area 210 of wing box 200 through access opening 244 in bottom skin panel 214. Robot arm 254 may be extended to position assembly tool module 256 to perform fastening operations, in this example, to fasten wing spar cap 224 to bottom skin panel 214 at fastener location 280.

After fastening operations are completed at fastener location 280, robot arm 254 may be operated to move assembly tool module 256 to a second fastener location to perform fastening operations at the second fastener location. The process may be repeated until fastening operations have been performed at all fastening locations accessible through access opening 244. Robot-deployed assembly tool 250 may then be moved to another access opening, for example, access opening 242, and fastening operations may then be performed at fastener locations accessible through access opening 242. The process may be repeated until all fastening operations have been completed.

Robot-deployed assembly tool 250 may be operated by a user from a remotely-located control console shown at 270. Control console 270 may, for example, be a computer having video display terminal 272, keyboard 274, storage devices 276 which may include permanent and removable storage media, and mouse 278. Additional input devices may also be included within computer 270 such as, for example, a joystick, trackball, touchpad and the like.

Figure 3:
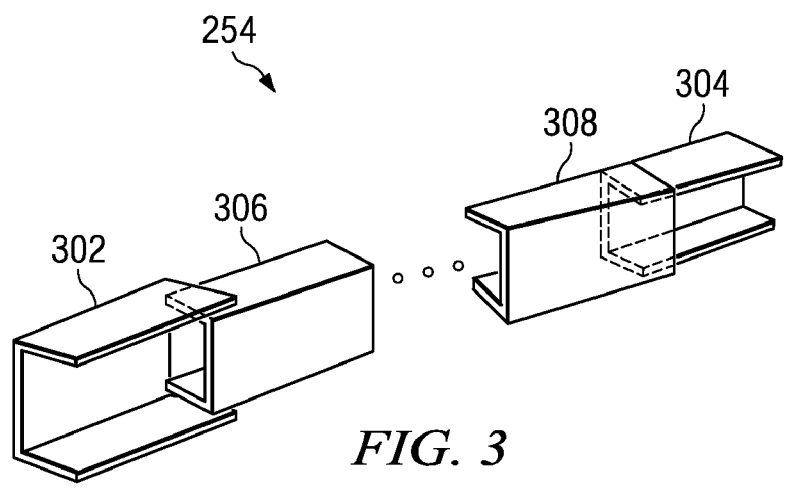
FIG. 3 is an illustration of the robot arm of the robot-deployed assembly tool of FIG. 2 in accordance with an advantageous embodiment of the disclosure.

FIG. 3 is an illustration of robot arm 254 of robot-deployed assembly tool 250 of FIG. 2 in accordance with an advantageous embodiment of the disclosure. Robot arm 254 may include a plurality of links including first link 302 connected to robot base 252 in FIG. 2, last link 304 having assembly tool module 256 in FIG. 2 attached thereto, as will be described hereinafter, and a plurality of intermediate links including links 306 and 308. The links of robot arm 254 may be positioned relative to each other and to interior area 210 by hydraulically, electrical or pneumatically actuated control mechanisms, not shown, known to a person with ordinary skill in the art. The control mechanisms may move robot arm 254 between a nested position (not shown in FIG. 3) in which robot arm 254 is fully retracted and an extended position in which the arm is fully extended (also not shown). In the advantageous embodiment illustrated in FIG. 3, the links are configured as C-channel-shaped links and may be retracted or extended by rotating one link with respect to another. It should be understood, however, that robot arm 254 can be formed of links of other suitable configurations, for example, links in the form of blocks of rectangular cross-section, and the links may be extended and retracted by other mechanisms without departing from advantageous embodiments.

Figure 4A:
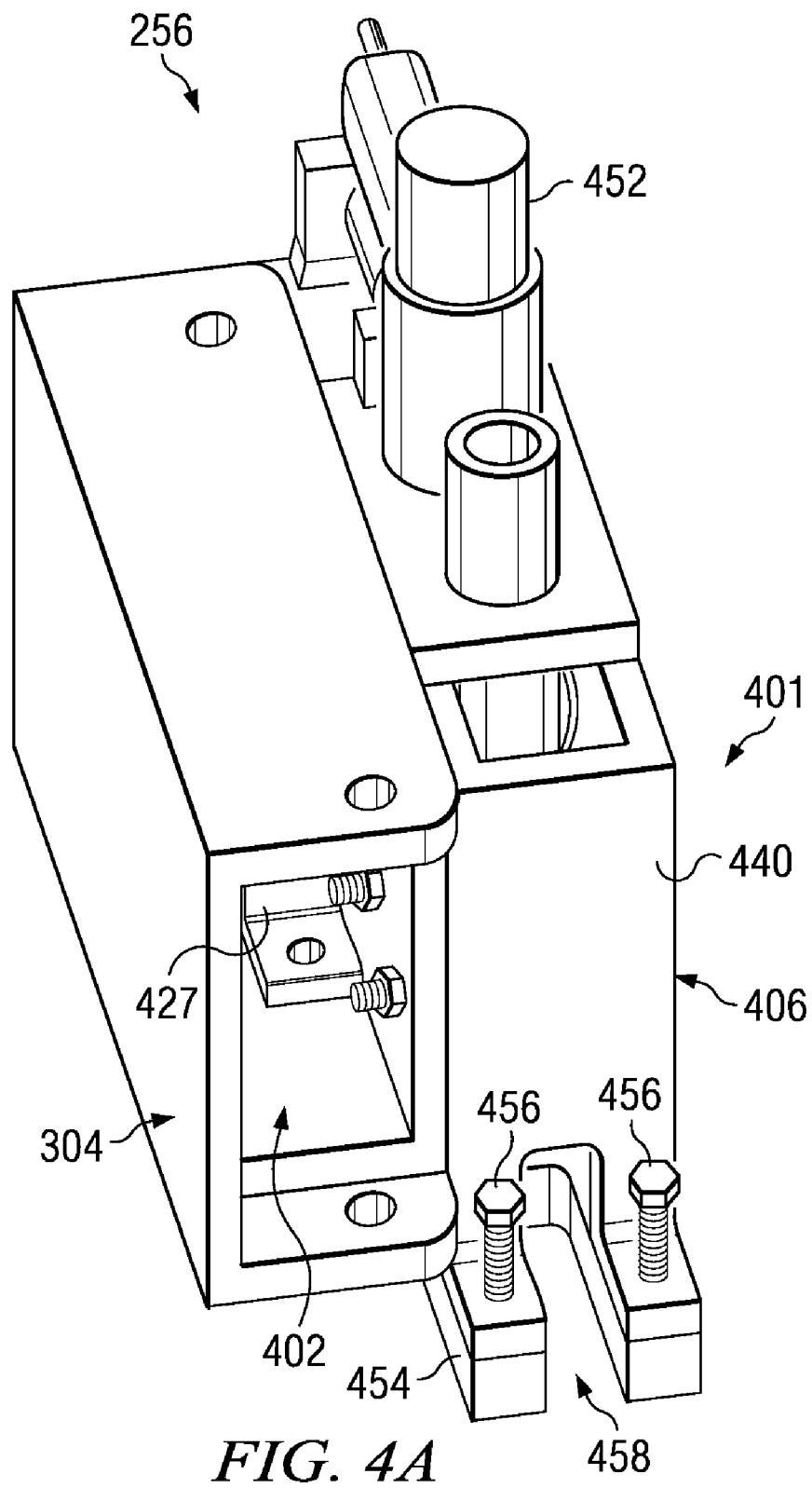
FIGS. 4A and 4B are illustrations of an assembly tool module of the robot-deployed assembly tool of FIG. 2 in nested and deployed positions, respectively, in accordance with an advantageous embodiment of the disclosure.
Figure 4B:
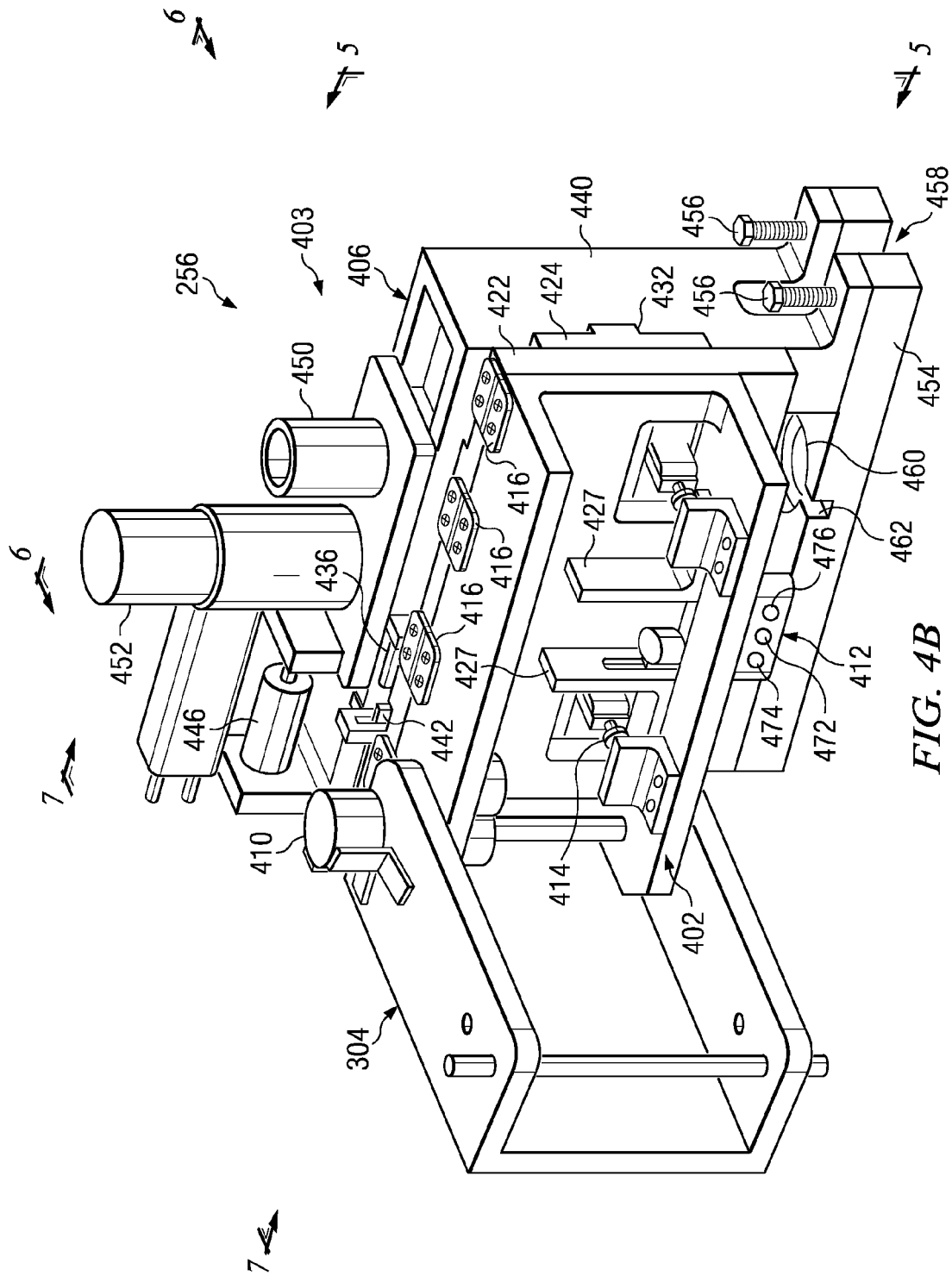
Figure 5:
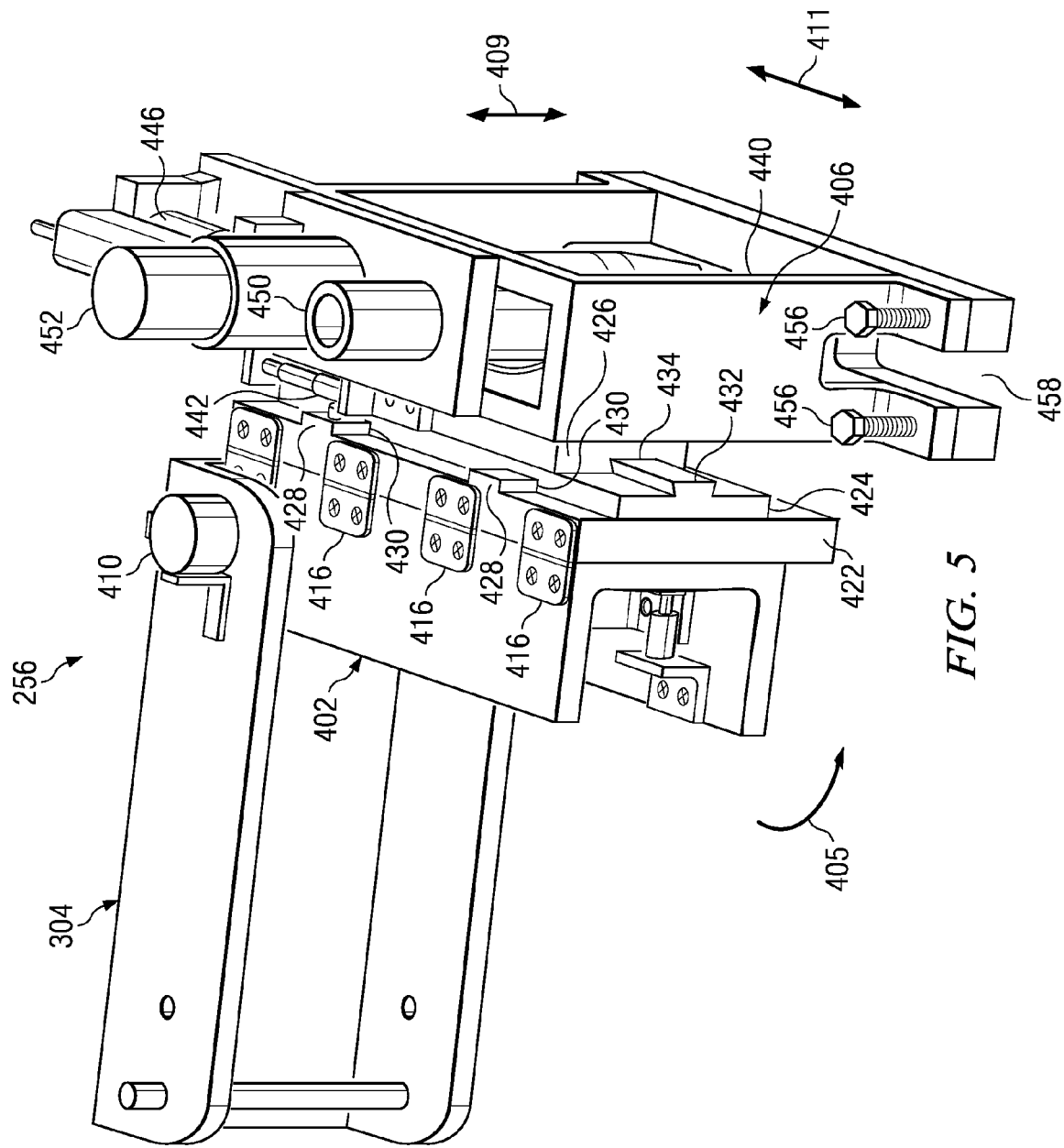
FIGS. 5, 6 and 7 are illustrations showing different views of the deployed assembly tool module of FIG. 4B.
Figure 6:
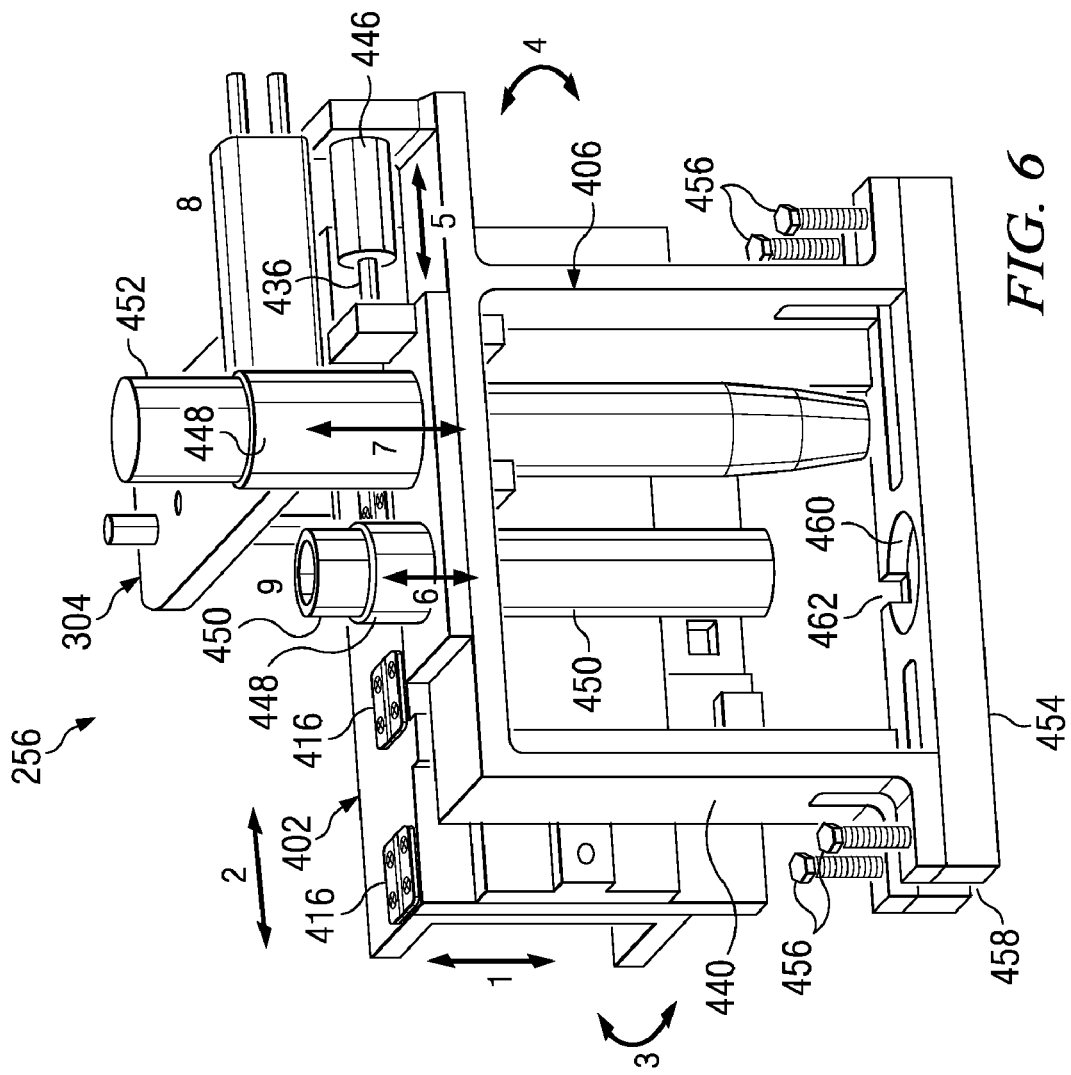
Figure 7:
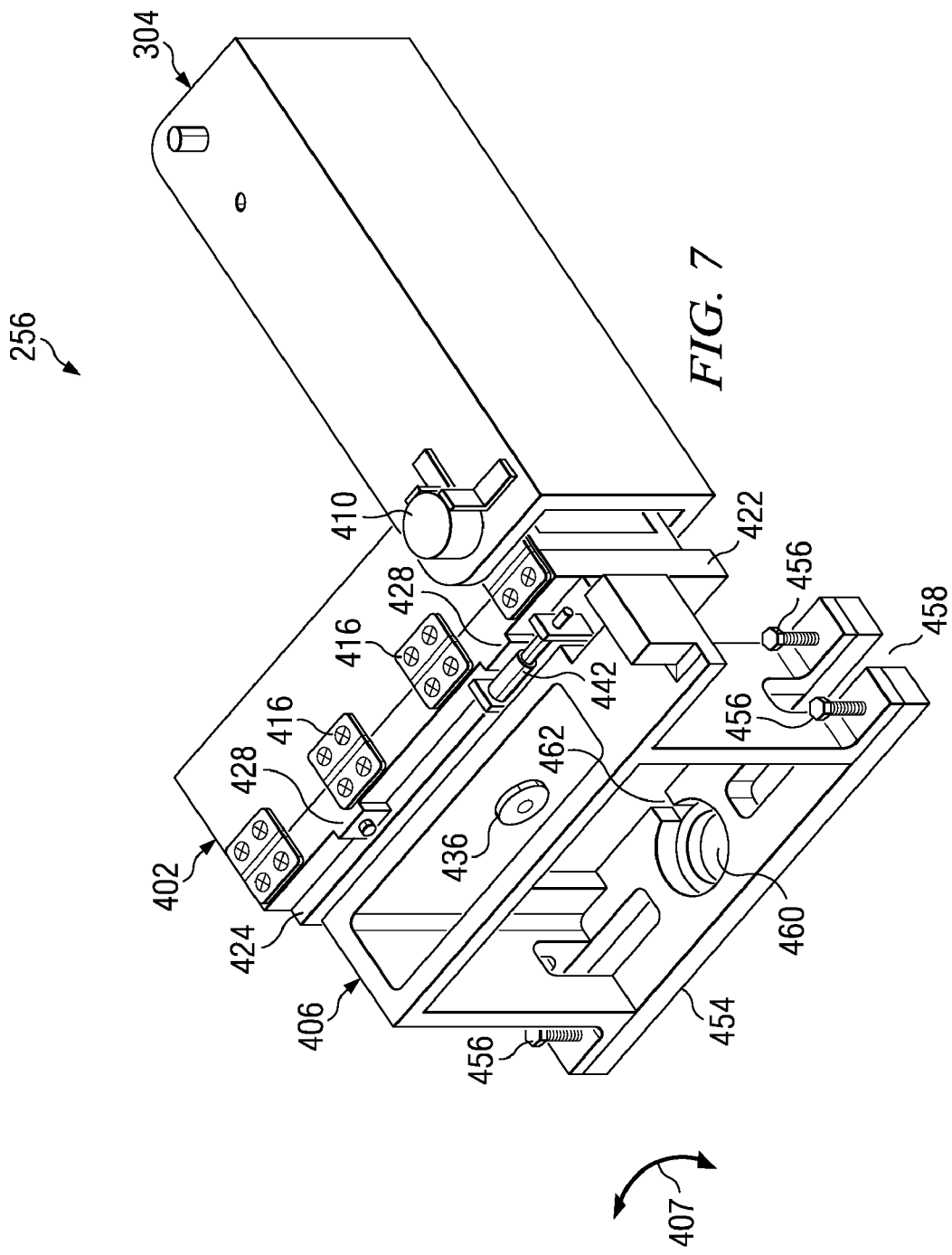

FIGS. 4A and 4B are illustrations of assembly tool module 256 shown in FIG. 2 in nested 401 and deployed 403 positions, respectively. FIGS. 5, 6 and 7 are illustrations of different views of the deployed assembly tool module 256 of FIG. 4B. The directions of the different views are indicated by arrows in FIG. 4B referring to each of FIGS. 5-7. FIG. 7 illustrates assembly tool module 256 with various portions, including utility tools 450 and 452, removed for clarity. Assembly tool module 256 may include several components which are described in detail below with reference to FIGS. 4A, 4B and 5-7.

Connector link 402 is attached to last link 304 of robot arm 254, and may function as an interface between the robot arm and an assembly tool generally designated by reference number 406.

As best shown in FIG. 4B, connector link 402 may be mounted to robot arm link 304 via a deploying mechanism, generally designated by reference number 410, that may include, but is not limited to, a motor and an appropriate set of gears to rotate the connector link and the assembly tool mounted thereto relative to robot arm link 304 between nested position 401 shown in FIG. 4A and deployed position 403 shown in FIG. 4B.

In the advantageous embodiment illustrated in FIGS. 4A-7, robot arm links are configured as C-channel-shaped links as illustrated in FIG. 3, and connector link 402 is also configured as a C-channel-shaped link and is sized to be received within robot arm link 304 when in nested position 401 shown in FIG. 4A. It should be understood, however, that connector link 402 may be of other appropriate configurations, and it is not intended to limit advantageous embodiments to any particular configuration.

Connector link 402 may support vision module 412 and actuator mechanism 414 that provides for rotation of assembly tool 406 as will be described hereinafter. Connector link 402 may be connected to assembly tool 406 via a plurality of hinges 416 connected to back plate 422 as will also be described more fully hereinafter.

Vision module 412 may include camera 472, light source 474 and laser sensor 476. As best shown in FIG. 4B, vision module 412 may be movable up and down along rails 427 between a stowed position (not shown) within connector link 402 for protection before deployment of assembly tool module 256 from robot arm link 304, and a deployed position shown in FIG. 4B. An operator may use camera 472 and light source 474 of vision module 412 to guide movement of robot arm 254 within interior area 210 of wing box 200. Laser sensor 476 may serve as a position check for an intended drilling location. Vision module 412 may also be used to check for drilling quality after a drilling operation has been performed, for example, without limitation, to check the diameter and roundness of a drilled hole, hole edge distance and its perpendicularity to the drilled surface, and, in general, may be used to inspect the overall fastening operation.

As best shown in FIG. 5, assembly tool 406 may be connected to connector link 402 by three plates, referred to herein as back plate 422, middle plate 424 and front plate 426. As indicated above, back plate 422 may be hinged to the top of connector link 402 by four hinges 416 to provide for outward rotation of assembly tool 406 relative to connector link 402. Back plate 422 may include two vertical rails 428 on the front surface thereof.

Middle plate 424 may include two vertical grooves 430 and horizontal rail 432, and front plate 426 may include horizontal groove 434 and round stud 436, shown in FIG. 7. Vertical rails 428 of back plate 422 may be slidably received in vertical grooves 430 of middle plate 424 so that the middle plate can glide up and down along the vertical rails. Horizontal rail 432 of middle plate 424 may be received in horizontal groove 434 of front plate 426, so that the front plate may glide horizontally relative to the middle plate. Round stud 436 may provide a mounting and rotation for assembly tool housing 440 through rotation actuator 442 mounted at the top corner of front plate 426.

Tool assembly housing 440 is a frame that may support various utility tools carried by assembly tool 406 and may include a set of mounting and sliding plates for the utility tools. Tool motion actuator 446 may be attached to a side plate at the top of the housing.

Utility tools of assembly tool 406 according to an advantageous embodiment may include dispensing tool 450 for dispensing a collar/nut/washer and securing tool 452 for securing a collar/nut dispensed by dispensing tool 450. As will be described hereinafter, both dispensing tool 450 and securing tool 452 may be movable up and down by tool motion actuator 448 away from and toward a drilled hole so as to be able to perform their functions.

Clamping foot 454 may be attached to the lower legs of housing 440 via four bolts 456. Clamping foot 454 may be formed of steel or another suitable material and enables electromagnetic clamping to be achieved in conjunction with operation of an external portable electromagnet illustrated at 298 in FIG. 2. Clamping foot 454 functions to stabilize and clamp components being drilled/assembled between clamping foot 254 and the portable magnet, and may eliminate any gap between the components prior to drilling. This clamping process may enable substantially burr-less drilling of a hole through the components. Clamping foot 454 may include fork-like cutouts 458 extending from either end to avoid interference with fasteners when the foot is moved to and set at new drilling locations. Hole 460 in clamping foot 454 may provide drilling clearance. Channel notch 462 may be included in clamping foot 454 to provide an open path for a laser beam from vision module 412 to help locate a drilling position.

In general, clamping foot 454, housing 440 and utility tools 450 and 452 comprise a subassembly of assembly tool 406 that may be moved to maintain tool perpendicularity to a drilled surface. The subassembly enjoys the combinations of two rotations (rotation 405 shown in FIG. 5 and rotation 407 shown in FIG. 7) and two translations (vertical 409 and horizontal 411 as shown in FIG. 5) for minor positioning adjustment. FIG. 6 illustrates various motions and actions generally available using assembly tool module 256, using a table and correspondingly numbered arrows. According to advantageous embodiments, all motions and utility tool actions may be either pneumatically, electrically or hydraulically powered and remotely controlled by control console 270, via various actuators, linkages, etc., from external of the interior area within which the robot-deployed assembly tool is to operate. It should be understood, however, that other forms of power and remote control mechanisms may also be utilized and it is not intended to limit exemplary embodiments of the disclosure to any specific manner of control.

Figure 8:
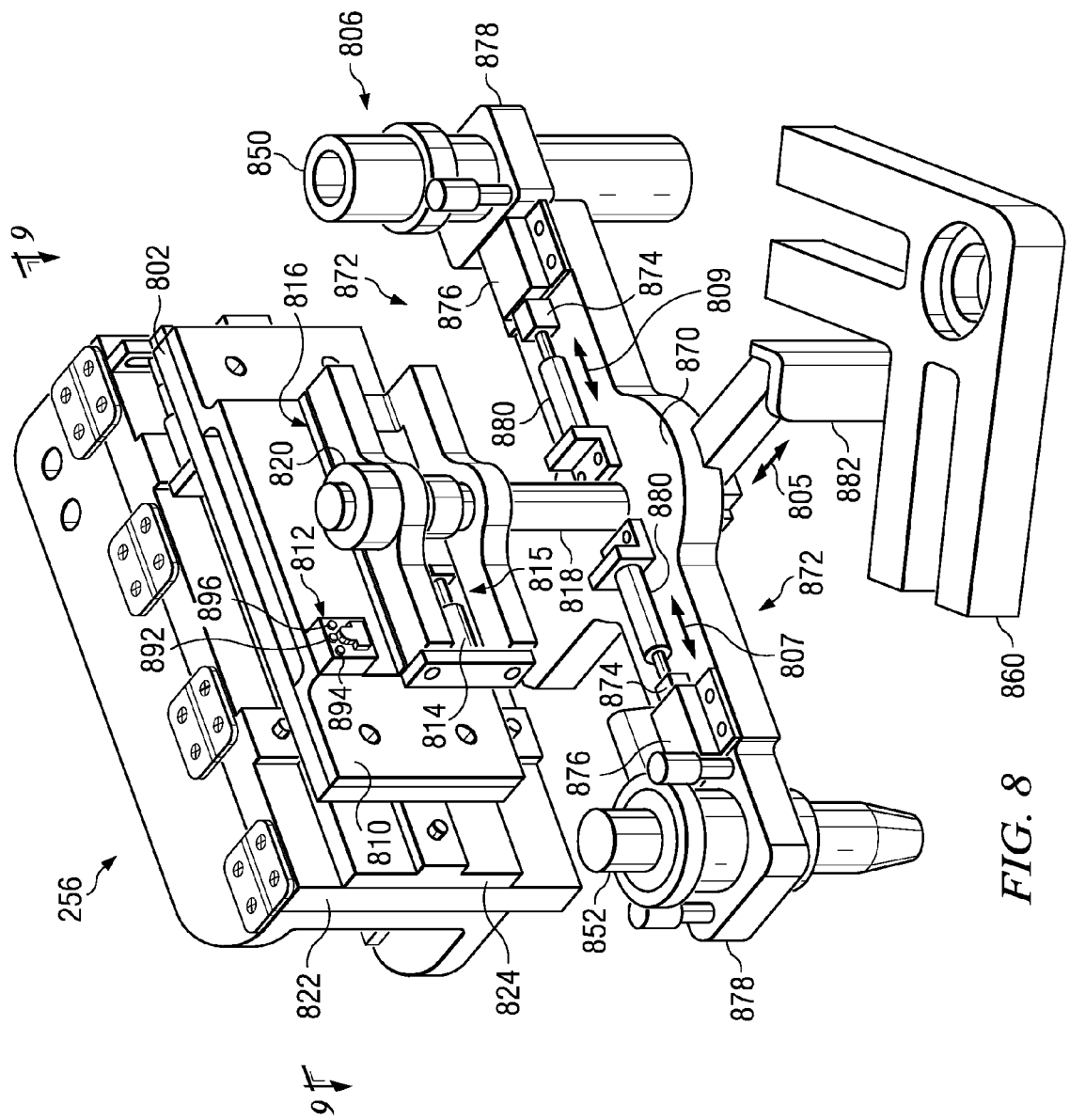
FIG. 8 is an illustration of an assembly tool module in accordance with a further advantageous embodiment of the disclosure.
Figure 9:
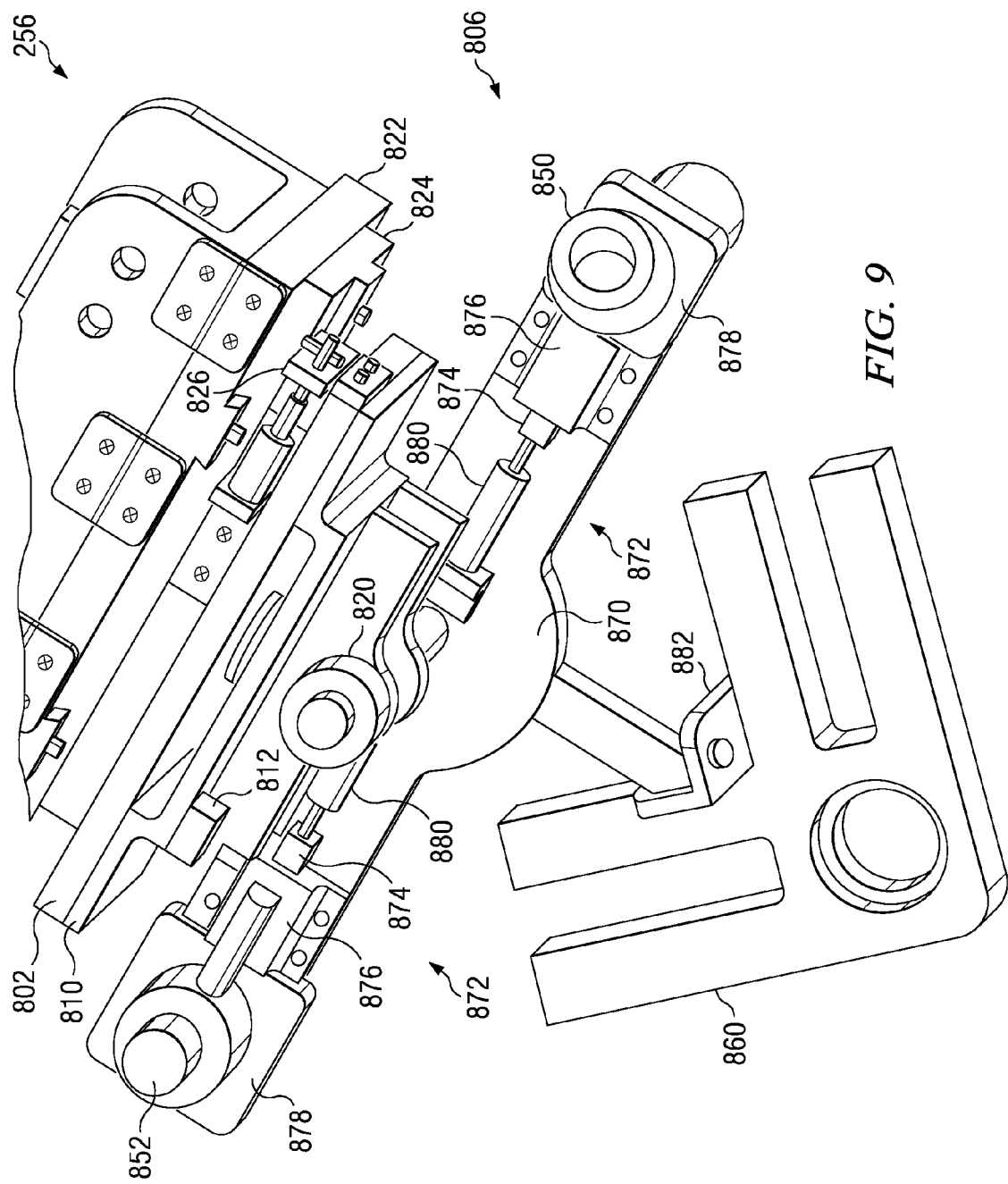
FIG. 9 is an illustration of a top view of the assembly tool module of FIG. 8.

Assembly tool module 256 illustrated in FIGS. 4A-7 may be particularly effective at fastener locations that are centrally located within a wing box (referred to as straight fastener locations 230 in FIG. 2). Robot mobility of the assembly tool module 256 illustrated in FIGS. 4A-7 may be limited in corner fastener locations (referred to as corner fastener locations 232 in FIG. 2) by structural interference. FIG. 8 is an illustration of an assembly tool module 256 in accordance with a further advantageous embodiment of the disclosure. FIG. 9 is an illustration of a partial top view of assembly tool module 256 of FIG. 8 looking in the direction of arrows 9-9 in FIG. 8. The assembly tool module 256 shown in FIGS. 8 and 9 may be particularly suitable for performing fastening operations at corner locations such as corner fastener locations 232 in FIG. 2. Assembly tool module 256 in FIGS. 8 and 9 may be advantageously attached to a second robot arm (not shown) that will work side-by-side with assembly tool module 256 shown in FIGS. 4A-7 that may carry utility tools for straight fastener locations.

Assembly tool module 256 may include transition plate 802, shown in FIGS. 8 and 9, which replaces housing 440 of assembly tool 406 illustrated in FIGS. 4A-7. Transition plate 802 may be connected to a group of motion control plates (back plate 822, middle plate 824 and front plate 826) that may be similar to plates 422, 424 and 426 in assembly tool module 256 shown in FIGS. 4A-7. Transition plate 802 maintains the rotational ability of assembly tool 806 with respect to front motion control plate 826 and may provide the building foundation for new tool components. To reach corner fastener locations with agility, assembly tool module 256 shown in FIGS. 8 and 9 may possess four additional degrees of freedom (one shaft rotation illustrated by arrow 803 and three tool translations illustrated by arrows 805, 807, and 809 in FIG. 8).

Utility bracket 810 may be attached to transition plate 802. Utility bracket 810 provides tool shaft support, and may also house front vision module 812, actuator 814 and a rack and glide track, generally designated by reference number 816.

Front vision module 812 may be located at the upper left side of utility bracket 810. Front vision module 812 may include camera 892, light source 894, and laser unit 896, and may be provided in addition to a back vision module (not shown in FIGS. 8 and 9). Front vision module 812 may further help an operator navigate the robot deployed assembly tool within the interior area 210 of wing box 200.

Rack and pinion drive 815 is a set of gears to provide rotary tool shaft motion that switches and positions the utility tools for a desired hole location. The rack may glide on a track attached to utility bracket 810 while the pinion may be keyed to rotary tool shaft 818.

Rotary tool shaft 818 enables the switching of utility tools 850 and 852 and clamping foot 860. Upper shaft lock 820 and a lower pin (not shown) keep shaft 818 in place on utility bracket 810. The lower end of shaft 818 may be attached to tool deploy platform 870.

Tool deploy platform 870 may be a T-shaped component at the lower end of rotary shaft 818. It may hold utility tools 850 and 852, clamping foot 860, and their respective activation actuators. The combinations of rotating tool shaft and actuator motions facilitate the deployment of utility tools 850 and 852 and clamping foot 860.

Tool motion guide set 872 is a linear motion guidance that may consist of slider 874, guide housing 876 and tool holder 878 for each tool. The linear motion may be initiated by actuator 880 using, for example, either a hydraulically, electrical or pneumatically powered piston rod.

Tapered clamping foot 860 occupies a central position of tool deploy platform 870. It may be attached to angle holder 882 for easy reach and to avoid interference. Clamping may be activated by, but is not limited to, an external electromagnet 298, shown in FIG. 2, through a stack of aluminum skin and spar cap or aluminum skin and bulkhead flange of a typical wing box.

Figure 10:
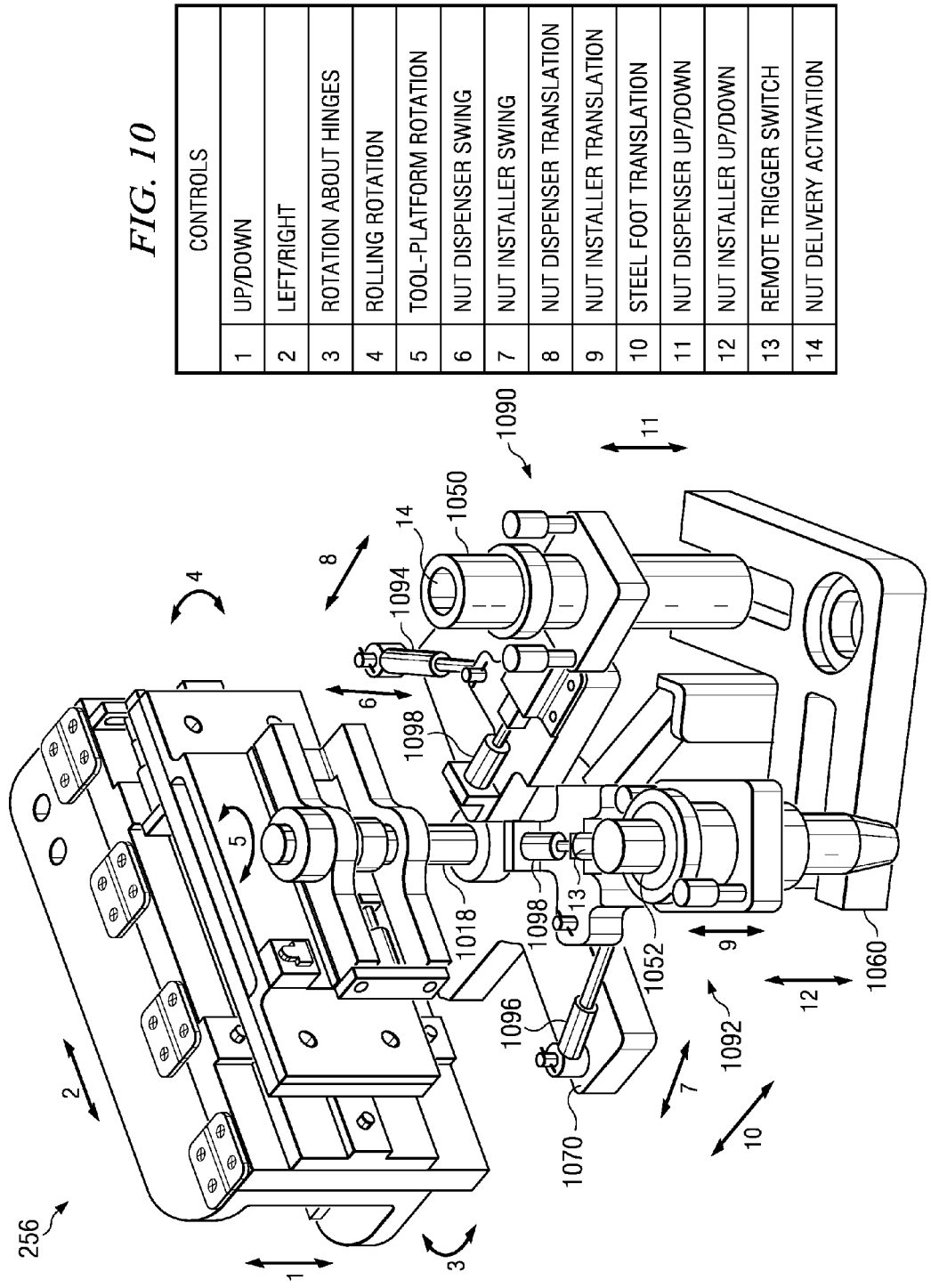
FIG. 10 is an illustration of an assembly tool module in accordance with yet a further advantageous embodiment of the disclosure.

FIG. 10 is an illustration of an assembly tool module 256 in accordance with yet a further advantageous embodiment of the disclosure. The assembly tool module 256 shown in FIG. 10 may be similar to assembly tool module 256 illustrated in FIGS. 8 and 9.

Assembly tool module 256 shown in FIG. 10 differs from assembly tool module 256 shown in FIGS. 8 and 9 in that dispensing tool 1050 and securing tool 1052 may be deployed with swing-arm features. Specifically, clamping foot 1060 maintains clamping throughout an entire cycle for one fastener installation. This may help ensure precise burr-less drilling and may reduce cycle time by not having to release and retract the foot between dispensing and securing operations as in assembly tool module 256 illustrated in FIGS. 8 and 9. Assembly tool module 256 shown in FIG. 10 provides many controllable motions. FIG. 10 also illustrates the various motions and actions that may be available using assembly tool module 256 using a table and correspondingly numbered arrows.

Components of assembly tool module 256 shown in FIG. 10 may include dispensing tool swing arm 1090 and securing tool swing arm 1092. Dispensing tool swing arm 1090 may be fitted to rotary tool shaft 1018 and may be swung around shaft 1018 using actuator 1094 attached to tool deploy platform 1070. Dispensing tool 1050 may be attached to arm 1090 and hence swings with the arm.

Securing tool swing arm 1092 may be similar to dispensing tool swing arm 1090 and controls the position of securing tool 1052. It may be attached to the opposite side of tool deploy platform 1070 and may be caused to swing by actuator 1096.

In operation, a robot arm, not shown in FIG. 10, may position assembly tool module 256 at a desired drilling location within a wing box, also not shown in FIG. 10. Clamping of the assembly tool module 256 to an internal surface of the wing box may be activated by an external electromagnet and maintained during drilling and fastener placement operations. With the foot clamping still in place, actuator 1094 on tool deploy platform 1070 may swing dispensing tool 1050 and position it over the tail portion of a fastener in coordination with tool translation actuator 1098. The dispensing tool 1050 may then retract to a default position after dispensing a collar/nut. With the foot clamping still activated, securing tool 1052 may be swung by actuator 1096 to position securing tool 1052 over the dispensed collar/nut, again in coordination with its tool translation actuator 1098, to secure the collar/nut to the fastener.

Securing tool 1052 may then be retracted to a default position (not shown), the clamping may be deactivated and the robot arm may retract assembly tool module 1000 and move it to a next fastener location.

To use the robot-deployed assembly tool 250 in accordance with advantageous embodiments of the disclosure, fixed global coordinate information, illustrated at 292 in FIG. 2, may be stored in control console 270 to control general robot movements. In addition, fine positioning adjustments (illustrated by local coordinates 292 in FIG. 2) may be performed by the assembly tool module using control console 270.

Figure 11:
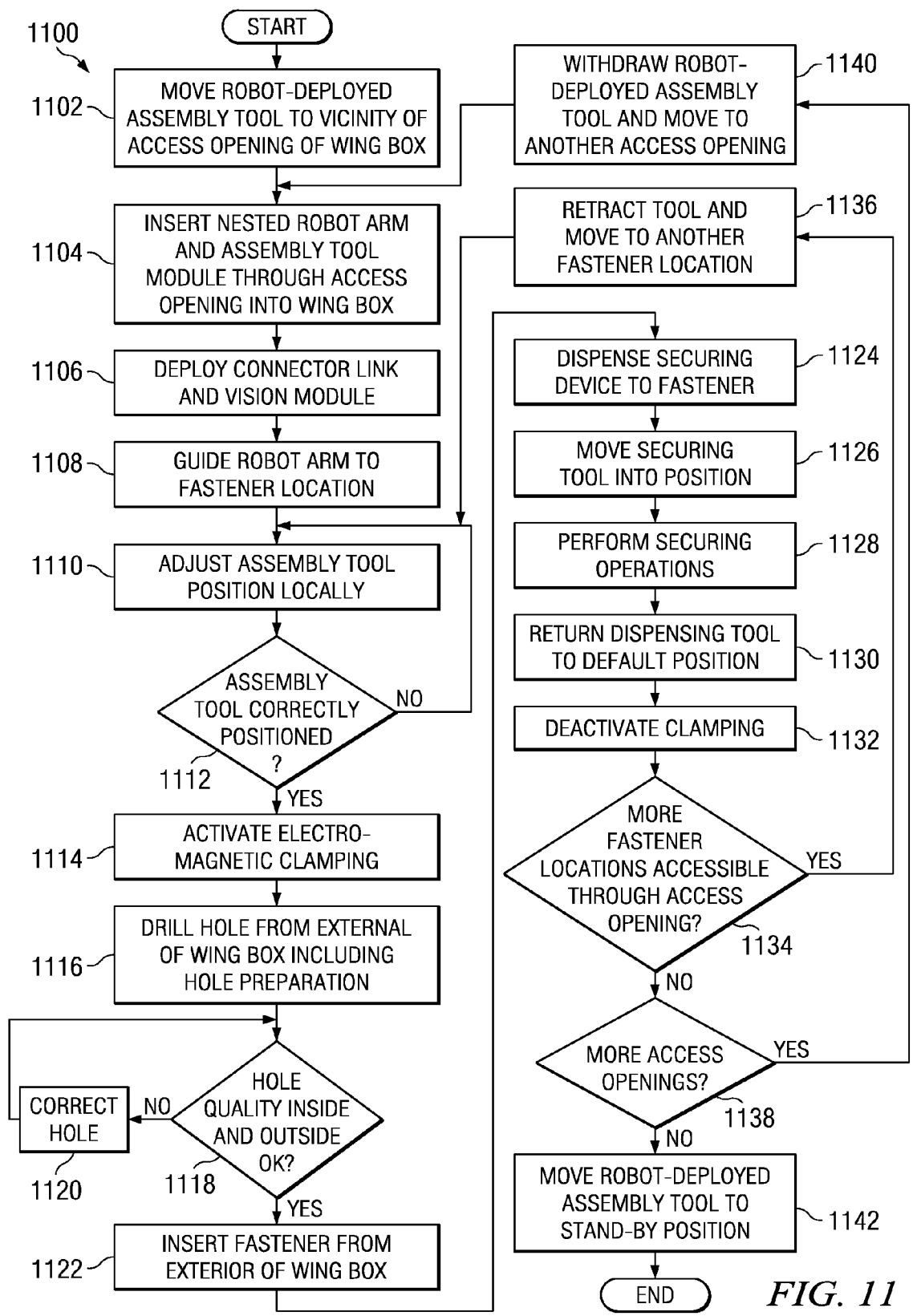
FIG. 11 is a flowchart that illustrates a method for installing fasteners in a wing box of an aircraft in accordance with an advantageous embodiment of the disclosure.

FIG. 11 is a flowchart that illustrates a method for installing fasteners in a wing box of an aircraft, such as wing box 200 of aircraft 100 in accordance with an advantageous embodiment of the disclosure. The method is generally designated by reference number 1100 and may begin by moving a robot-deployed assembly tool 250 along tracks 258 to the vicinity of an access opening 244 in a wing box 200 to be assembled (Step 1102). Nested links, e.g., links 302-308, of a robot arm 254 of the robot-deployed assembly tool 250 carrying an assembly tool module 256 may then be inserted through the access opening 244 and into an interior area 210 of the wing box 200 (Step 1104).

A connector link 402 of the assembly tool module 256 may then be deployed from the last link 304 of the robot arm 254 to ready a vision module 412 on the connector link 402 for deployment (Step 1106). The deployed vision module 412 may then be used to guide robot movement, and the links 302-308 of the robot arm 254 may be deployed successively, for example, by rotating one nested link with respect to another, to guide the assembly tool module 256 to a desired fastener location in the interior area 210 of the wing box 200 (Step 1108). An assembly tool 406 of the assembly tool module 256 may then be precisely positioned through local adjustment (Step 1110). A camera 472 and laser sensor 476 in the vision module 412 may be used to assist a user at control console 270 in performing this fine adjustment, for example, by moving a cursor on video display terminal 272 using mouse 278.

A determination may be made as to whether the assembly tool 406 is correctly positioned (Step 1112). If the assembly tool 406 is not correctly positioned (No output of Step 1112), the method may return to step 1110 for further local adjustment of the assembly tool 406 by the user. If the assembly tool 406 is correctly positioned (Yes output of Step 1112), electromagnetic clamping of the assembly tool to an interior surface of the wing box 200 may be externally activated by the user using an external electromagnet 298 (Step 1114).

Drilling of a hole through wing box components to be assembled, e.g., wing spar cap 224 and bottom skin panel 214, may then be performed from externally of the wing box 200 (Step 1116). Such drilling operation may include hole preparation such as countersinking, for example. Because of the clamping operation, any gap between the two components being drilled is substantially eliminated resulting in substantially burr-less drilling. The camera 472 and laser sensor 476 may be used by the user at control console 270 to check the drilled hole after the drilling operation to determine whether the hole is of an acceptable quality, both inside and outside the hole (Step 1118). If the hole is not of acceptable quality (No output of Step 1118), the hole may be corrected as needed, for example, by a further drilling operation (Step 1120).

If the drilled hole is of acceptable quality (Yes output of Step 1118), an operator may then insert a fastener such as a bolt or screw into and through the drilled hole from the exterior of the wing box 200 (Step 1122), and a dispensing utility tool, for example, dispensing tool 450 of tool assembly 406 may be caused to deliver a fastener securing element such as a collar or nut to the inserted fastener (Step 1124). An embodiment may include various size collars or nuts and the mechanism to install the various size collars or nuts. The dispensing utility tool 450 may then be moved away to make room for a subsequent utility tool to follow. A securing utility tool, for example, securing utility tool 452 of tool assembly 406 may then be moved into position (Step 1126) and caused to perform required operations to permanently attach the fastener by use of the securing device acting on the fastener, such as gripping, swaging and/or tail-pin breaking operations on the fastener securing element (Step 1128), and the assembly tool 406 may then be moved so that the dispensing utility tool will be in the default position for the next fastener installation operation (Step 1130).

The clamping may then be deactivated (Step 1132), and a determination may be made whether there are more fastener locations accessible through the access opening 244 at which fasteners are to be installed (Step 1134). If there are more fastener locations (Yes output of Step 1134), the robot arm 254 may retract the tool 406 and guide the tool 406 to another fastener location (Step 1136) and the method may return to Step 1110 for processing/installing a fastener at the new location.

If there are no further fastener locations accessible through the access opening 244 (No output of Step 1134), a determination may be made as to whether there are any further access openings through which the robot-deployed assembly tool 250 should be inserted to install additional fasteners (Step 1138). If there are further access openings, for example, access opening 242 (Yes output of Step 1138), the robot-deployed assembly tool 250 may be withdrawn and moved to the next access opening 242 (Step 1140) and the method returns to Step 1104. If there are no more access openings (No output of Step 1138), the robot-deployed assembly tool 250 may be moved along tracks 258 to a stand-by position (not shown) for the next assembly operation (Step 1142), and the process sequence ends. The stand-by position may be a storage location remote from the wing box 200 at which the robot-deployed assembly tool 250 is stored for later use.

The description of advantageous embodiments has been presented for purposes of illustration and description, and is not intended to be exhaustive or limited to the form disclosed. Many modifications and variations will be apparent to those of ordinary skill in the art. For example, although advantageous embodiments are described in connection with assembling a wing box for an aircraft, the embodiments may also be used to assemble other types of structures such as structures associated with ships and other vehicles and buildings. Also, the assembly tool according to advantageous embodiments can include different or additional utility tools to perform different or additional assembly operations. For example, the assembly tool can also include a drilling utility tool to drill holes from inside a structure being assembled rather than causing the holes to be drilled from the exterior of the structure. Further, different advantageous embodiments may provide different advantages as compared to other advantageous embodiments. The embodiment or embodiments selected are chosen and described in order to best explain features and practical applications, and to enable others of ordinary skill in the art to understand various embodiments with various modifications as are suited to particular uses that are contemplated.

What is claimed is:

1. A method for assembling a structure, the structure defining an interior area accessible through at least one access opening, the method comprising:
   inserting a robot having an assembly tool mounted thereto into the interior area through the at least one access opening;
   positioning the assembly tool at a fastener location;
   clamping the assembly tool to an interior surface of the structure using an electromagnet external of the structure to eliminate a gap and enable a burr-less drilling process;
   making a hole through the structure; and
   installing a fastener in the hole.

2. The method according to claim 1, wherein inserting a robot having an assembly tool mounted thereto into the interior area through the at least one access opening, comprises:
   inserting a robot arm having the assembly tool mounted thereto into the interior area through the at least one access opening.

3. The method according to claim 2, wherein positioning the assembly tool at a fastener location, comprises:
   positioning the assembly tool at a fastener location adjacent an interior surface of the structure.

4. The method according to claim 3, wherein positioning the assembly tool at a fastener location adjacent an interior surface of the structure, comprises:
   extending the inserted robot arm; and
   adjusting the position of the assembly tool with respect to the fastener location.

5. The method according to claim 4, wherein adjusting the position of the assembly tool with respect to the fastener location, comprises:
   adjusting the position of the assembly tool with respect to the fastener location with the aid of a vision module on the assembly tool.

6. The method according to claim 3, wherein clamping the assembly tool to the structure comprises:
   clamping the assembly tool to the interior surface of the structure.

7. The method according to claim 6, wherein clamping the assembly tool to the interior surface of the structure comprises:
   clamping the assembly tool to the interior surface of the structure to substantially eliminate any gap between components of the structure to be assembled.

8. The method according to claim 1, wherein making a hole through the structure, comprises:
   drilling a hole through the structure.

9. The method according to claim 8, wherein drilling a hole through the structure comprises:

drilling a hole through the structure from exterior of the structure.

10. The method according to claim 9, wherein clamping the assembly tool to the structure, comprises:
   clamping the assembly tool to an interior surface of the structure to substantially eliminate any gap between components of the structure to be assembled during drilling of the hole through the structure.

11. The method according to claim 1, wherein installing a fastener in the hole, comprises:
   inserting a fastener through the hole wherein an end portion of the fastener extends into the interior area; and
   operating the assembly tool to attach a fastener securing element to the end portion of the fastener.

12. The method according to claim 11, wherein installing a fastener in the hole further comprises;
   operating the assembly tool to dispense the fastener securing element to the fastener prior to operating the assembly tool to attach the fastener securing element to the end portion of the fastener.

13. The method according to claim 12, wherein operating the assembly tool to attach the fastener securing element to the end portion of the fastener comprises:
   operating the assembly tool to crimp the fastener securing element to the end portion of the fastener.

14. The method according to claim 1, wherein the fastener location comprises one of a plurality of fastener locations accessible through the at least one access opening, and wherein the method further comprises:
   positioning the assembly tool at each of the plurality of fastener locations; and
   repeating the positioning, clamping, making and installing steps at each of the plurality of fastener locations.

15. The method according to claim 14, wherein the at least one access opening comprises a plurality of access openings, and wherein the method further comprises:
   inserting the robot having the assembly tool mounted thereto into the interior area through each of the plurality of access openings; and
   repeating the positioning, clamping, making and installing steps at each of a plurality of fastener locations accessible through each of the plurality of access openings.

16. The method according to claim 1, wherein the interior area comprises a confined interior area accessible through the at least one access opening.

17. The method according to claim 1, wherein the structure comprises a wing box for an aircraft.

18. A method for assembling a structure, the structure defining an interior area accessible through at least one access opening, the method comprising:
   inserting a robot arm having an assembly tool mounted thereto into the interior area through the at least one access opening;
   positioning the assembly tool at a fastener location;
   clamping the assembly tool to an interior surface of the structure, using an electromagnet external of the structure, to substantially eliminate any gap between components of the structure to be assembled to enable burr-less drilling;
   making a hole through the components to be assembled while the assembly tool is clamped to the interior surface of the structure; and
   installing a fastener in the hole to secure the components to be assembled.

19. The method according to claim 18, wherein making a hole through the components to be assembled, comprises:
   drilling a hole through the components to be assembled.

20. The method according to claim 19, wherein drilling a hole through the components to be assembled, comprises:
   drilling a hole through the components to be assembled from external of the structure.

21. The method according to claim 18, wherein installing a fastener in the hole to secure the components to be assembled, comprises:
   inserting a fastener through the hole wherein an end portion of the fastener extends into the interior area; and
   operating the assembly tool to attach a fastener securing element to the end portion of the fastener.

22. The method according to claim 21, wherein installing a fastener in the hole to secure the components to be assembled further comprises:
   operating the assembly tool to dispense the fastener securing element to the fastener prior to operating the assembly tool to attach the fastener securing element to the end portion of the fastener.

23. The method according to claim 18, wherein the fastener location comprises one of a plurality of fastener locations accessible through the at least one access opening, and wherein the method further comprises:
   positioning the assembly tool at each of the plurality of fastener locations; and
   repeating the positioning, clamping, making and installing steps at each of the plurality of fastener locations.

24. The method according to claim 23, wherein the at least one access opening comprises a plurality of access openings, and wherein the method further comprises:
   inserting the robot having the assembly tool mounted thereto into the interior area through each of the plurality of access openings; and
   repeating the positioning, clamping, making and installing steps at each of a plurality of fastener locations accessible through each of the plurality of access openings.

25. The method according to claim 18, wherein the structure comprises a wing box of an aircraft.

* * * * *